United States Patent
Oh et al.

(10) Patent No.: US 6,888,670 B2
(45) Date of Patent: May 3, 2005

(54) HYBRID-TYPE LOW-NOISE DISPERSION COMPENSATING OPTICAL FIBER AMPLIFIER

(75) Inventors: Wang-yuhl Oh, Daejon (KR); Seung-il Myong, Daejon (KR); Hyun-jae Lee, Daejon (KR)

(73) Assignee: Electronics and Telecommunications Research Institute (KR)

(*) Notice: Subject to any disclaimer, the term of this patent is extended or adjusted under 35 U.S.C. 154(b) by 16 days.

(21) Appl. No.: 10/364,635

(22) Filed: Feb. 11, 2003

(65) Prior Publication Data
US 2003/0161030 A1 Aug. 28, 2003

(30) Foreign Application Priority Data
Feb. 23, 2002 (KR) .......................... 2002-9739

(51) Int. Cl.[7] .................................................. H01S 3/00
(52) U.S. Cl. .................. 359/334; 359/337.4; 359/337.5
(58) Field of Search ............................. 359/334, 337.1, 359/337.4, 337.5

(56) References Cited
U.S. PATENT DOCUMENTS 5,887,093 A    3/1999  Hansen et al.
6,462,862 B2 * 10/2002 Kinoshita ................... 359/334
6,600,595 B2 * 7/2003  Aida et al. ................ 359/341.3
6,693,740 B2 * 2/2004  Gray et al. ............... 359/337.4

* cited by examiner

Primary Examiner—Mark Hellner
(74) Attorney, Agent, or Firm—Blakely Sokoloff Taylor & Zafman (57) ABSTRACT

A low-noise optical fiber amplifier for performing a long-distance optical transmission in a wavelength division multiplexing optical transmission apparatus is provided. This amplifier includes a first optical fiber amplifier having a pre-stage optical fiber, and a first coupler for supplying pump light to the pre-stage optical fiber; a dispersion compensating Raman amplifier (DCRA) connected to the first optical fiber amplifier and having a dispersion compensating optical fiber (DCF) that compensates for the dispersion accumulated in an optical line and generates a Raman gain, and a second coupler for supplying Raman pump light onto the DCF; and a second optical fiber amplifier connected to the DCRA, and including a post-stage optical fiber and a third coupler for supplying pump light onto the post-stage optical fiber. Accordingly, this optical fiber amplifier is used for terrestrial WDM optical transmission, and thus has remarkably low noise figure compared to the existing optical amplifiers. For this reason, the optical fiber amplifier is available in long-distance transmission, and can be used in optical networks.

9 Claims, 6 Drawing Sheets

HYBRID-TYPE LOW-NOISE DISPERSION COMPENSATING OPTICAL FIBER AMPLIFIER

BACKGROUND OF THE INVENTION

1. Field of the Invention

The present invention relates to a low-noise optical fiber amplifier for use in a wavelength division multiplexing (WDM) optical transmission apparatus that uses a single-mode optical fiber as a transmission line.

2. Description of the Related Art

The use of an optical fiber amplifier in WDM optical transmission apparatuses triggers researches into an erbium-doped fiber amplifier (EDFA). Also, an increase in communication results in a need for more channels in a WDM optical transmission apparatus, which draws a lot of interests in a wide-band optical fiber amplifier. Further, much research is made on long-distance transmission of a wide-band optical signal. For the long-distance transmission of a wide-band signal, a method of using a low-noise optical amplifier, a method of inducing a Raman gain in an optical line, or a method of setting a distance between repeaters to be about 50 km is used.

In the case of a terrestrial system, a distance between optical repeaters must be more than 80 km, the use of a single-mode optical fiber (SMF) is considered, and a network must be reconstructed whenever a channel is added or dropped.

SUMMARY OF THE INVENTION

To solve the above-described problems, it is an object of the present invention to provide a low-noise dispersion compensating optical fiber amplifier for performing a long-distance transmission in a terrestrial wavelength division multiplexing (WDM) optical transmission apparatus that adopts a single-mode optical fiber as a transmission line.

Accordingly, to achieve an aspect of the above object, there is provided a hybrid-type low-noise dispersion compensating optical fiber amplifier including: a first optical fiber amplifier having a pre-stage optical fiber, and a first coupler for supplying pump light to the pre-stage optical fiber; a dispersion compensating Raman amplifier (DCRA) connected to the first optical fiber amplifier and having a dispersion compensating optical fiber (DCF) that compensates for the dispersion accumulated in an optical line and generates a Raman gain, and a second coupler for supplying Raman pump light onto the DCF; and a second optical fiber amplifier connected to the DCRA, and including a post-stage optical fiber and a third coupler for supplying pump light onto the post-stage optical fiber.

To achieve another aspect of the above object, there is provided a hybrid-type low-noise dispersion compensating optical fiber amplifier including: a first optical fiber amplifier including a pre-stage optical fiber, and a first coupler for supplying pump light to the pre-stage optical fiber; a DCRA connected to the first optical fiber amplifier, the DCRA including a DCF that compensates for the dispersion accumulated in an optical line and generates a Raman gain, a second coupler for polarizably multiplexing two Raman pump lights whose polarizations are perpendicular to each other and for supplying the Raman pump lights to the DCF in the forward direction, and a third coupler for supplying Raman pump light to the DCF in the reverse direction; and a second optical fiber amplifier connected to the DCRA, and including a post-stage optical fiber and a fourth coupler for supplying pump light to the post-stage optical fiber.

Preferably, the gain of the first optical fiber amplifier is adjusted not to operate the DCRA in a non-linear region while the length of the pre-stage optical fiber and the intensity of pump light supplied to the pre-stage optical fiber are adjusted to operate the first optical fiber amplifier in a non-saturation region.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Figure 1:
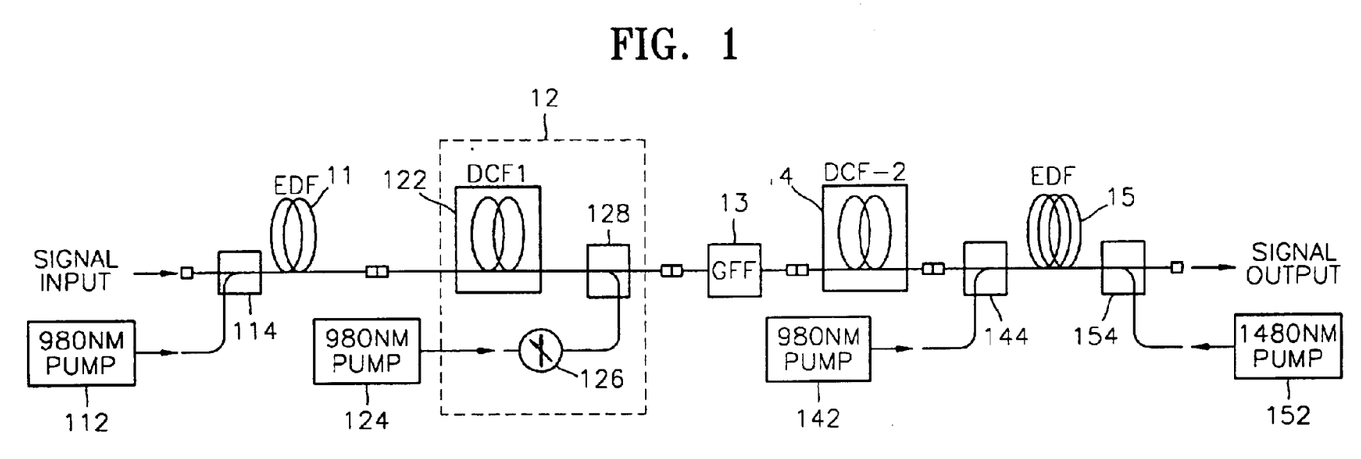
FIG. 1 is a block diagram of a preferred embodiment of an optical fiber according to the present invention.

FIG. 1 is a block diagram of a preferred embodiment of an optical fiber amplifier according to the present invention, especially, a schematic view of a hybrid-type low-noise dispersion compensating optical fiber amplifier (DCFA) having a wide dynamic range in which gains are fixed independently with whether a channel is added or dropped.

In this embodiment, a dispersion compensating fiber (DCF) that compensates for chromatic dispersion is used in a dispersion compensating Raman amplifier (DCRA). The DCRA is connected to a short erbium-doped fiber amplifier (EDFA).

The optical fiber amplifier of FIG. 1 has a first EDFA that includes a pre-stage erbium-doped fiber (EDF) 11, a first coupler 114 and a first optical source 112; a DCRA 12 connected to the first EDFA and including a DCF 122, a second coupler 128, an optical fiber depolarizer 126, and a second optical source 124; and a second EDFA including a post-stage EDF, a 980/1550 nm coupler 144, a 1480/1550 nm coupler 154, and two optical sources 142 and 152.

When an optical signal is input to the first EDFA, the first coupler 114 combines the input optical signal with a pump light of 980 nm and supplies the coupled signal to the pre-stage EDF 11. Here, the pump light of 980 nm is generated by the first optical source 112. Also, the pump light of 980 nm is incident on the first EDFA in the forward direction, but another pump light of a different wavelength may be incident on the first EDFA in the forward or inverse direction.

The DCRA 12 is connected to the first EDFA, and includes a DCF 122 that generates a Raman gain while compensating for an accumulated dispersion in an optical line. The second coupler 128 supplies a Raman pump light onto the DCF 122 in the inverse direction. Here, the Raman pump light is generated by the second optical source 124. Lyot-type optical fiber depolarizer may be installed between the second optical source 124 and the second coupler 128 so as to depolarize the Raman pump light output from the second optical source 124, thereby removing the dependence of a Raman gain upon polarization of pump light. In order to obtain a desirable transmission performance within a wavelength band of a signal, an optical source, which supplies a pump light onto the DCF 122, may be, for example, a pumping optical source such as a laser diode that generates light of 1440 nm or 1450 nm.

In the second EDFA, the optical source 142 of 980 nm, which generates a pump light of 980 nm, and the 980/1550 coupler 144 for supplying the pump light of 980 nm to the EDF 15 in the forward direction are installed in the front of the EDF 15. Also, at the back of the EDF 15, the optical source 152 of 1480 nm, which generates a pump light of 1480 nm, and the 1480/1550 coupler 154 for supplying the pump light of 1480 nm to the EDF 15 are installed.

Meanwhile, a gain flattening filter (GFF) 13, which flattens a gain per wavelength, may be installed between the DCRA 12 and the second EDFA. Also, a second DCF 14 may be further installed to compensate for dispersion remaining in the optical line that was compensated for by the DCRA 12.

Figure 2:
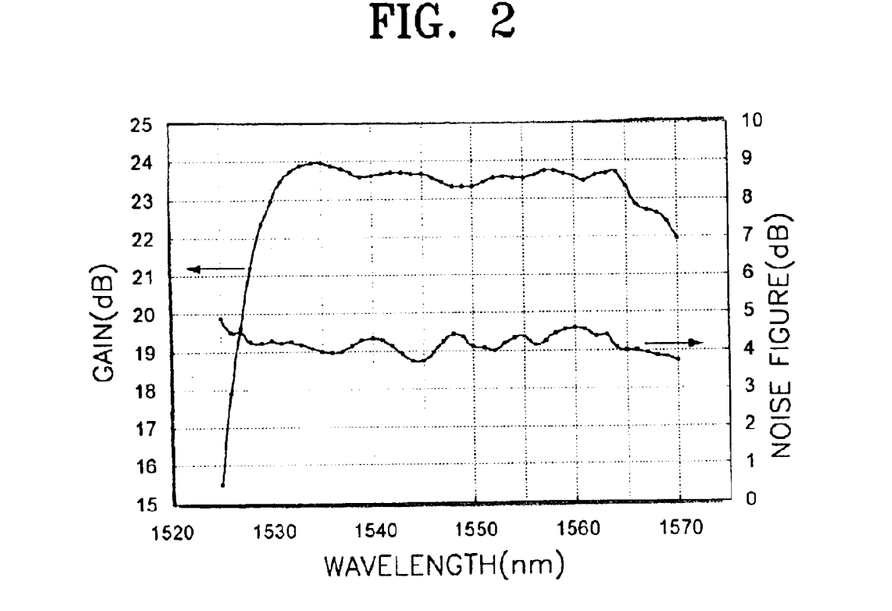
FIGS. 2 through 6 are graphs illustrating the features of the optical fiber amplifier of FIG. 1.

FIG. 2 is a graph illustrating a variation in the gain and noise figure of an optical fiber amplifier according to the present invention. The graph of FIG. 2 reveals that when forty channels having light of −18.5 dBm are input to an optical fiber amplifier according to the present invention, the optical fiber amplifier has a gain of 23.5±0.5 dB and a noise figure of 4.4±0.5 dB in a region having a wavelength from 1530 nm to 1565 nm.

Figure 3:
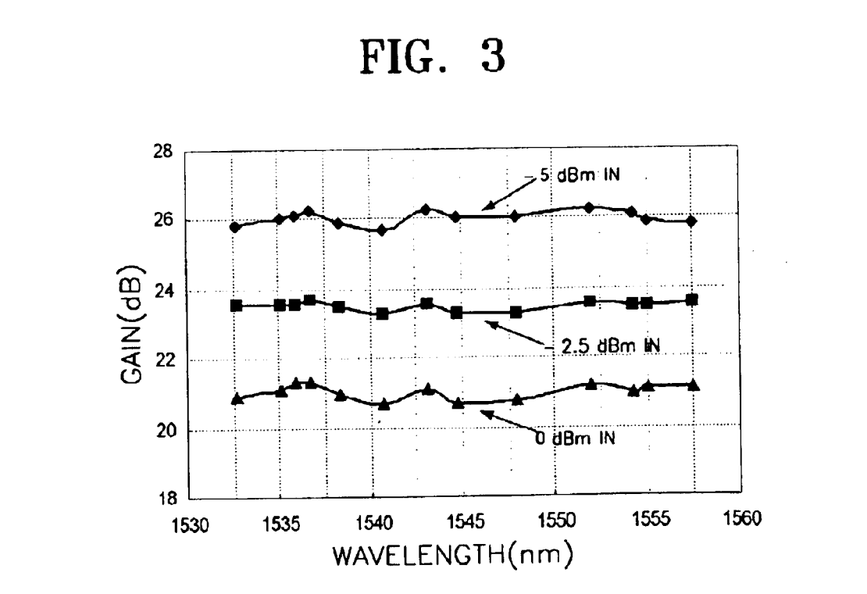

FIG. 3 shows graphs illustrating variations in a gain of an optical fiber amplifier according to the present invention if optical signals of −5 dBm, −2.5 dBm, and 0 dBm are input to the optical fiber amplifier, respectively. Referring to FIG. 3, it is noted that the intensity of output light per channel can be regularly kept by adjusting the intensity of a pump light of a DCRA in the event that the intensity of input light changes, so that a gain of the optical fiber amplifier changes according to a change in the intensity of input light.

Figure 4A:
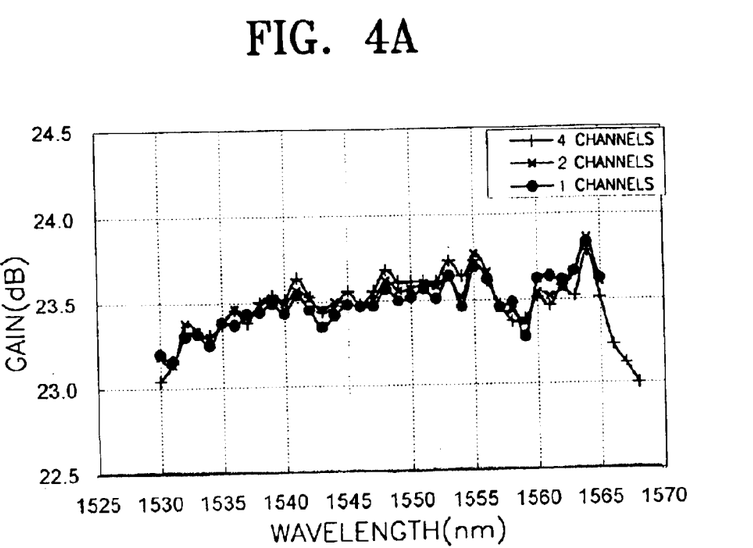
Figure 4B:
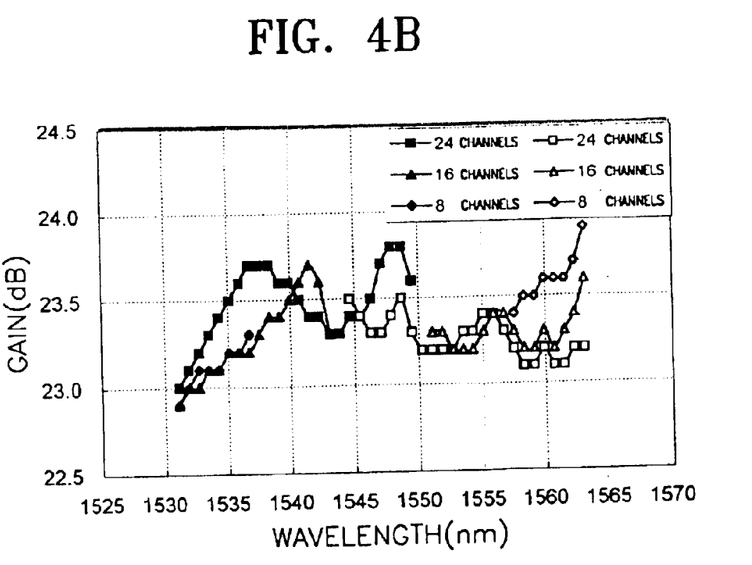

FIGS. 4A and 4B are graphs each illustrating variations in a gain of an optical fiber amplifier according to the present invention when the number of channels changes, i.e., a channel(s) is(are) deleted or added. More specifically; FIG. 4A illustrates variations in a gain of the optical fiber amplifier in the event that one, two and four channels remain, and FIG. 4B illustrates variations in a gain of the optical fiber amplifier if eight, sixteen and twenty-four channels remain. Even if the number of channels changes, it is possible to obtain regular gains of the optical fiber amplifier by adjusting the intensity of a pump light input to the post-stage EDFA in the forward direction.

Figure 5:
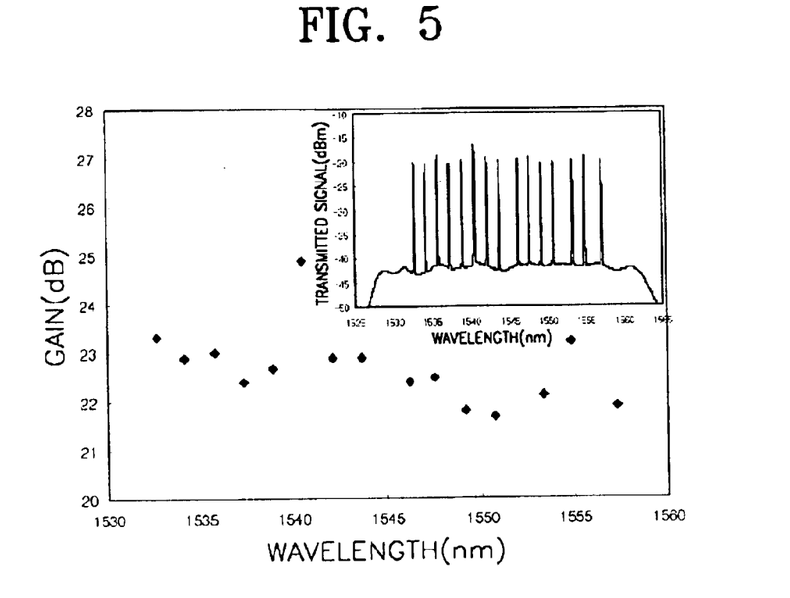

FIG. 5 is a graph illustrating the optical signal to noise ratio (OSNR) per signal channel after a signal is transmitted to 1482 km in case that a loss in a signal between line amplifiers is 25 dB, i.e., the length of transmission is 114 km and span loss is 0.22 dB/km.

Figure 6:
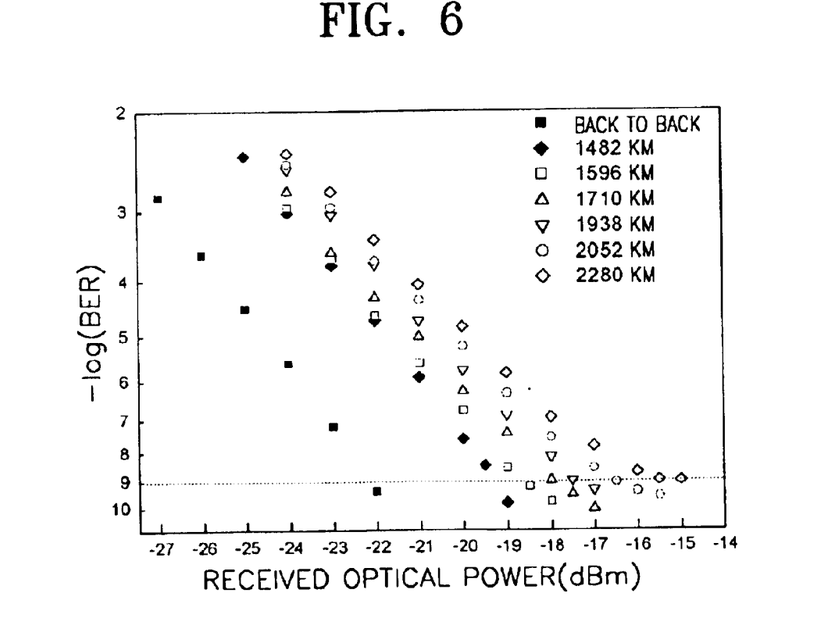

FIG. 6 is a graph illustrating bit error ratio (BER) estimated with regard to received optical power. The graph of FIG. 6 reveals that the BER of less than $10^{-9}$ is obtained although light is transmitted to 2280 km, and further, error floor does not occur in the BER of less than $10^{-11}$ obtained although light is transmitted to 1482 km.

The DCRA includes a DCF, and one laser diode that is used as a Raman pumping optical source. In this embodiment, the central wavelength of a pumping laser diode is set to be 1450 nm in order to obtain a gain for a signal having a wavelength of about 1550 nm. Here, an optical fiber depolarizer is adopted to remove the dependence of a Raman gain upon depolarisation of pump light. Further, a pump light is supplied in the reverse direction to remove variations in a gain of an optical fiber amplifier due to the fluctuation of the pump light.

An experiment revealed that the optimum Raman gain was obtained when using a DCF for compensating for a single mode fiber (SMF) of 60 km. Thus, preferably, this DCF is established in the DCRA, and an DCF is additionally installed at the rear surface of a gain flattening filter (GFF) so as to compensate for an SMF of more than 60 km. At this time, in the post-stage EDFA, pump light of 980 nm and pump light of 1480 nm are pumped onto an EDF of 30 m in the forward direction and in the reverse direction, respectively.

A pre-stage EDFA in which a short EDF having the length of 5 m is pumped by a laser diode having the length of 980 nm of 100 mW, is positioned at the foremost part of an optical fiber amplifier. In the pre-stage EDFA, pump light of appropriate intensity is supplied to a short optical fiber, so that the optical fiber amplifier operates within an available range of the intensity of an optical signal while not being saturated, thereby reducing noise figure of the optical fiber amplifier. Because the pre-stage EDFA is positioned at the foremost part of the optical fiber amplifier, it is possible to considerably reduce the noise figure of the optical fiber amplifier. At this time, a gain of the pre-stage EDFA is appropriately controlled so that the intensity of light output from the pre-stage EDFA, i.e., light input to DCRA, has a value in a range that non-linearity does not occur in the DCF, thereby making an optical fiber amplifier have appropriate gain and reduced noise figure.

In this embodiment, a hybrid low-noise DCOFA is fabricated by installing a short EDFA at the front end of a DCRA while connecting an EDFA at the rear end of the DCRA. As a result, it is possible to obtain an amplifier having improved gain and intensity of output light, reduced noise figure, and a wide dynamic range. When an experiment on the optical transmission was performed using a re-circulating loop and an optical fiber amplifier according to the present invention as an amplifier for a line, it revealed that the BER was $10^{-9}$ or less when a span loss is 25 dB which is equivalent in the length of transmission to 114 km assuming that span loss is 0.22 dB/km, even if light is transmitted to 2280 km (20 circulations).

Also, an optical fiber amplifier according to the present invention is capable of regularly maintaining an optical output by adjusting only pumping driving current and temperature of a DCRA when the intensity of light input to the optical fiber amplifier changes in a range of 5 dB due to changes in a loss in an optical line. Even if the number of input channels of optical signals changes in a range from 1 to 40, it is possible to obtain an output of the optical fiber amplifier having regular intensity of light per channel by controlling driving electric current of the post-stage EDFA.

Figure 7:
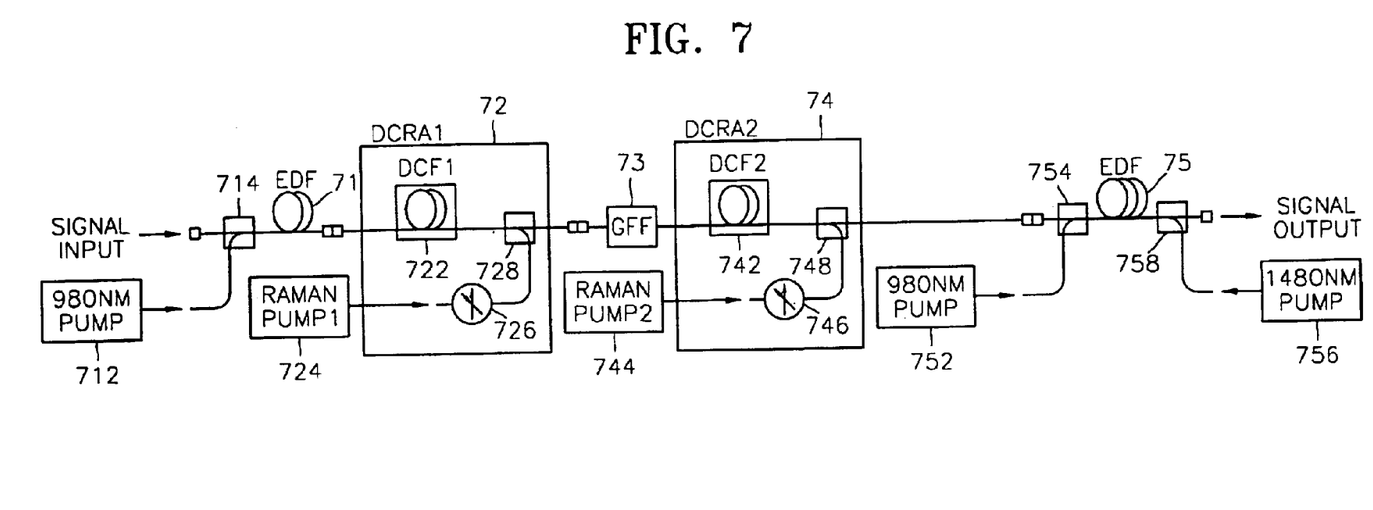
FIGS. 7 and 8 are block diagrams of embodiments of an optical fiber amplifier according to the present invention.
Figure 8:
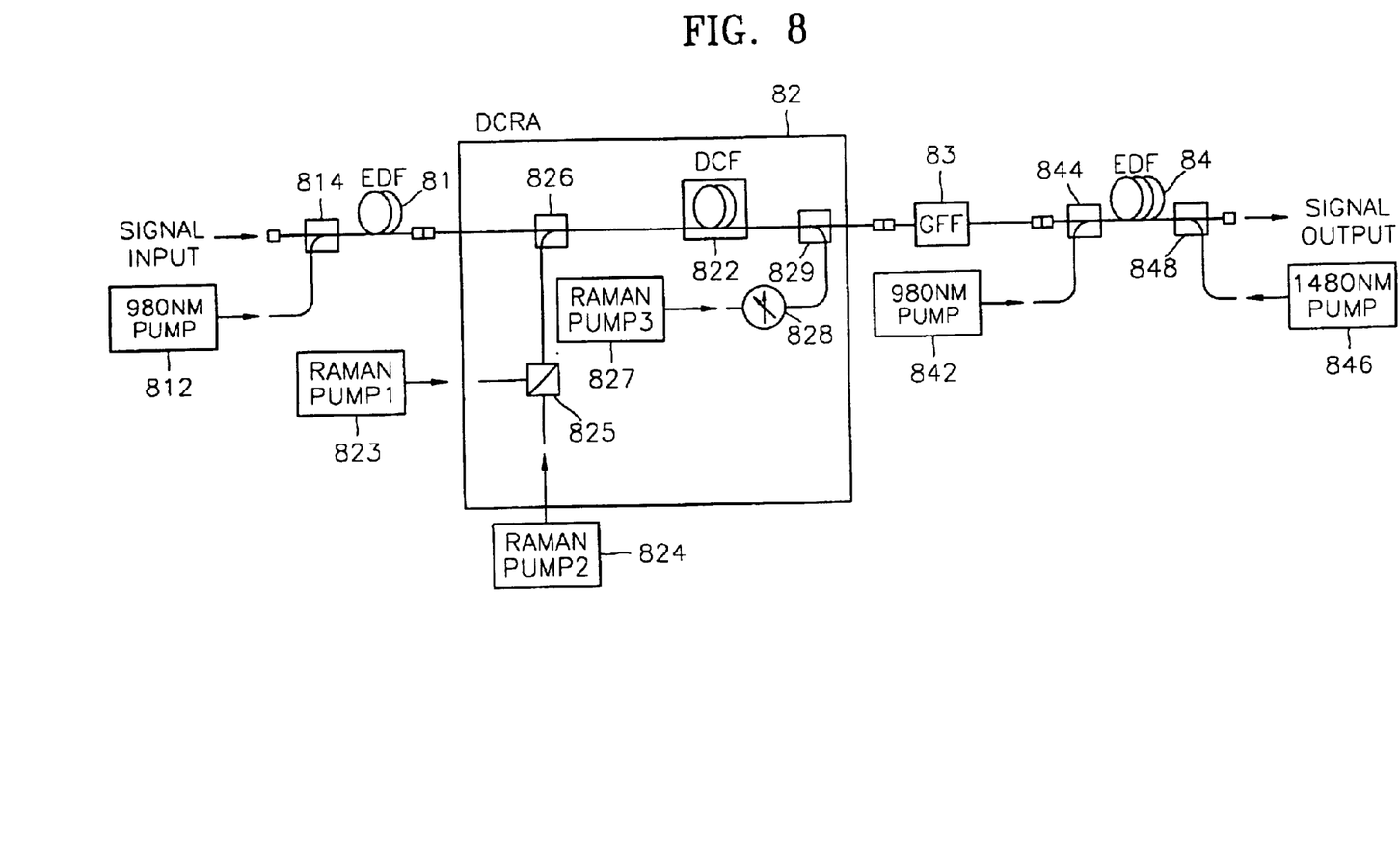

FIGS. 7 and 8 are block diagrams of other embodiments of the optical fiber amplifier of FIG. 1, which are improved low-noise dispersion compensating optical fiber amplifiers further including Raman pump light.

The optical fiber amplifier of FIG. 7 includes a first erbium-doped optical fiber amplifier (EDFA) that includes a pre-stage erbium-doped optical fiber (EDF) 71, a first coupler 714, and a first optical source 712; a first dispersion compensating Raman amplifier (CDRA1) 72 connected to the first EDFA and including a first dispersion compensating optical fiber (DCF1) 722, a second coupler 728, an optical fiber depolarizer 726, and a second optical source 724 for generating Raman pump light; and a second EDFA that consists of a post-stage EDF 75, a 980/1550 nm coupler 754, a 1480/1550 nm coupler 758, and two light sources 752 and 756.

In comparison with the optical fiber amplifier of FIG. 1, the optical fiber amplifier of FIG. 7 further includes a second DCRA (DCRA2) 74 that induces a Raman gain by pumping Raman pump light onto a second DCF (DCF2) 742 that is additionally installed to compensate for dispersion in a single mode fiber (SMF) of 60 km or more. The second DCRA 74 includes a second DCF (DCF2) 742, a third coupler 748, an optical fiber depolarizer 746, and a third optical source 744 for generating Raman pump light. The second DCRA 72 generates a Raman gain as well as compensates for the dispersion in an optical line. Therefore, in the event that a line is 100 km long, it is possible to even decrease noise figure of more than 0.4 dB by pumping Raman pump light onto the second DCF 742 that compensates for dispersion in the 40 Km SMF. Also, a gain-flattening filter (GFF) 73 may be installed between the first DCRA 72 and the second DCRA 74.

FIG. 8 is a diagram of still another embodiment of an optical fiber amplifier according to the present invention. In detail, the optical fiber amplifier of FIG. 8 is a low-noise dispersion compensating optical fiber amplifier capable of polarizably multiplexing a plurality of pump lights and pumping the pump lights to a DCF module in the forward direction without dividing the CDF module into two parts even if the length of a line is more than 60 km.

In the case of this amplifier, lights output from several optical sources can be incident upon the DCF at once through various methods so as to induce a Raman gain. Also, when pumping pump light onto the DCF, the dependence of a gain of the amplifier upon polarization of pump light can be excluded by multiplexing two pump lights whose polarizations are perpendicular to each other, instead of using a depolarizer.

The amplifier of FIG. 8 includes a first EDFA, a DCRA 82, a GFF 83, and a second EDFA. The first EDFA includes a pre-stage erbium-doped optical fiber (EDF) 81, a first coupler 814 that supplies pump light onto a pre-stage optical fiber, and a 980 nm optical source 812 that supplies pump light onto the first coupler 814. The second EDFA includes a post-stage EFD 84, a 980/1550 nm coupler 844, a 1480/1550 nm coupler 848, an optical source 842 that supplies pump light of 980 nm to the 980/1550 nm coupler 844, and an optical source 846 that supplies pump light of 1480 nm to the 1480/1550 nm coupler 848.

Being connected to the first EDFA, the DCRA 82 includes a DCF 822 that compensates for the dispersion accumulated in an optical line and generates a Raman gain; a multiplexer 825 that polarizably multiplexes two Raman pump lights that are output from the two optical sources 823 and 824, and whose polarizations are perpendicular to each other; and a second coupler 826 that supplies a Raman pump light, which is polarizably multiplexed, to the DCF 822 in the forward direction. The DCRA 82 further includes a third coupler 829 for supplying a third Raman pump light onto the DCF 822 in the reverse direction. Further, the amplifier of FIG. 8 may have an optical fiber depolarizer 828 for depolarizing Raman pump light output from a fourth optical source 827, so as to cancel the dependence of a Raman gain upon polarization of pump light.

Meanwhile, according to the aforementioned embodiments, it is possible to cancel the polarization of pump light, and then pump the pump light onto the DCF in the reverse or forward direction, or the both directions. It is described that dispersion in an optical line is compensated for by pumping pump light of 980 nm and pump light of 1480 nm onto the DCF in the second EDFA in the forward direction and the reverse direction, respectively. However, the compensation can be made using pump light having a different wavelength and/or direction. Further, instead of a C-band EDFA, an EDFA having different wavelength such as L-band EDFA can be combined with a DCRA. Also, a pre-stage optical fiber or a post-stage optical fiber may be formed of an optical fiber containing a rare-earth material, instead of an EDF.

Preferably, the length of a pre-stage EDFA or the intensity of pump light are set such that the pre-stage EDFA has a sufficiently large gain value in a region of the intensity of light an input signal may have while the range a pre-stage EDFA can operate in a non-saturation region, thereby reducing the noise figure of an optical fiber amplifier. Also, preferably, the gain of the EDFA is adjusted so that a DCRA does not operate in a non-linear region. If the pre-stage EDFA and the DCRA are set to be actuated in a non-saturation region, the intensity of output light per channel of an optical signal can be regularly maintained by adjusting the intensity of pump light input into the DCRA even if the level of an input optical signal changes.

While this invention has been particularly described with reference to preferred embodiments thereof, it will be understood by those skilled in the art that various changes in form and details may be made therein without departing from the spirit and scope of the invention as defined by the appended claims.

As described above, according to the present invention, a hybrid-type low-noise dispersion compensating optical fiber amplifier can be realized by coupling a DCRA with an EDFA and installing a short pre-stage EDFA, which can operate in a non-saturation region, at the front of the DCRA.

An optical fiber amplifier according to the present invention is used for terrestrial WDM optical transmission, and thus has remarkably low noise figure compared to the existing optical amplifiers. For this reason, the optical fiber amplifier according to the present invention is available in long-distance transmission, and can be used in optical networks.

The induction of Raman gains in an optical line is of much help in increasing a distance between optical repeaters and in case that there are many channels. However, to induce Raman gains in an optical line, there is a need to pump high-intensity Raman pump light to existing transmission lines. Also, the intensity of the Raman pump light must be very strong to obtain a Raman gain in an SMF optical transmission line in which a coefficient of a Raman gain is relatively smaller than the DCF. Further, preferably, a buried optical line is used in transmitting only signal light during optical transmission, if possible. Accordingly, technique of amplification using Raman gain in an optical line must be adopted in consideration of entire network, systems, and so on.

It is very beneficial to develop and use a low-noise optical fiber amplifier for various reasons. This amplifier requires a DCRA capable of compensating for the dispersion in the span of each optical fiber in an optical repeater in the event that a single-mode optical fiber is used as a transmission line and a channel is added or dropped. However, in this case, the DCRA and a GFF must be additionally installed in the optical fiber amplifier, which makes the optical fiber amplifier have a two-staged or multi-staged structure. Also, since the DCRA and the GFF are positioned between gain blocks, optical loss is inevitable therebetween. Therefore, in fact, it is difficult to realize a low-noise optical fiber amplifier.

To solve these problems, a hybrid-type low-noise dispersion compensating optical fiber amplifier according to the present invention uses the existing single-mode optical fiber only as a line for optical transmission, and can perform a long-distance optical transmission even if a distance between repeaters is more than 100 km. Also, this amplifier can maintain the intensity of light per channel by controlling the intensity of pump light output from the amplifier when the level of an input optical signal changes, or the number of channels of an optical signal changes due to the addition/dropping of a channel.

What is claimed is:

1. A hybrid-type low-noise dispersion compensating optical fiber amplifier comprising:
   a first optical fiber amplifier having a pre-stage optical fiber, and a first coupler for supplying pump light to the pre-stage optical fiber;
   a dispersion compensating Raman amplifier (DCRA) connected to the first optical fiber amplifier, the DCRA including a dispersion compensating optical fiber (DCF) that compensates for the dispersion accumulated in an optical line and generates a Raman gain, and a second coupler for supplying Raman pump light onto the DCF; and
   a second optical fiber amplifier connected to the DCRA, and including a post-stage optical fiber and a third coupler for supplying pump light onto the post-stage optical fiber,
   wherein a gain of the first optical fiber amplifier is adjusted so as not to operate the DCRA in a non-linear region, while the length of the pre-stage optical fiber and the intensity of pump light supplied to the pre-stage optical fiber are adjusted to operate the first optical fiber amplifier in a non-saturation region.

2. The amplifier of claim 1 further comprising a gain flattening filter for flattening a gain per wavelength while being connected between the DCRA and the second optical fiber amplifier.

3. The amplifier of claim 1 further comprising a second DCF connected between the DCRA and the second optical fiber amplifier, and for further compensating for the dispersion in optical lines.

4. The amplifier of claim 3 further comprising a coupler for supplying Raman pump light onto the second DCF.

5. The amplifier of claim 1, wherein the DCRA further comprises an optical fiber depolarize for depolarizing the Raman pump light so as to exclude the dependence of a Raman gain upon polarization of pump light.

6. A hybrid-type low-noise dispersion compensating optical fiber amplifier comprising:
   a first optical fiber amplifier including a pre-stage optical fiber, and a first coupler for supplying pump light to the pre-stage optical fiber;
   a DCRA connected to the first optical fiber amplifier, the DCRA including a DCF that compensates for the dispersion accumulated in an optical line and generates a Raman gain, a second coupler for polarizably multiplexing two Raman pump lights whose polarizations are perpendicular to teach other and for supplying the Raman pump lights to the DCF in the forward direction, and a third coupler for supplying Raman pump light to the DCF in the reverse direction; and
   a second optical fiber amplifier connected to the DCRA, and including a post-stage optical fiber and a fourth coupler for supplying pump light to the post-stage optical fiber,
   wherein a gain of the first optical fiber amplifier is adjusted so as not to operate the DCRA in a non-linear region, while the length of the pre-stage optical fiber and the intensity of pump light supplied to the pre-stage optical fiber are adjusted to operate the first optical fiber amplifier in a non-saturation region.

7. The amplifier of claim 6, wherein the DCRA further comprises an optical fiber depolarizer for depolarizing the third Raman pump light so as to exclude the dependence of a Raman gain upon polarization of pump light.

8. The amplifier of claim 1 or 6, wherein the second optical fiber amplifier comprises:
   a coupler of 980/1550 nm for supplying pump light of 980 nm to the post-stage optical fiber; and
   a coupler of 1480/1550 nm for supplying pump light of 1480 nm to the post-stage optical fiber in the reverse direction.

9. The amplifier of claim 1 or 6, wherein the pre-stage optical fiber or post-stage optical fiber comprises an optical fiber that is doped with rare-earth material including an erbium.

* * * * *